(12) United States Patent
Swanson et al.

(10) Patent No.: US 9,806,839 B2
(45) Date of Patent: Oct. 31, 2017

(54) OPTICAL COMPENSATION USING A SPACE DIVISION MULTIPLEXING ELECTRO-OPTIC RECEIVER

(71) Applicant: Acacia Communications, Inc., Maynard, MA (US)

(72) Inventors: Eric Swanson, Gloucester, MA (US); Christopher Doerr, Middleton, NJ (US); Graeme Pendock, Carlisle, MA (US)

(73) Assignee: Acacia Communications, Inc., Maynard, MA (US)

( * ) Notice: Subject to any disclaimer, the term of this patent is extended or adjusted under 35 U.S.C. 154(b) by 32 days.

(21) Appl. No.: 14/860,046

(22) Filed: Sep. 21, 2015

(65) Prior Publication Data
US 2016/0013880 A1    Jan. 14, 2016

Related U.S. Application Data (63) Continuation of application No. 14/071,217, filed on Nov. 4, 2013, now Pat. No. 9,154,253.

(60) Provisional application No. 61/722,223, filed on Nov. 4, 2012.

(51) Int. Cl.
*H04J 14/00*    (2006.01)
*H04B 10/61*    (2013.01)
*H04B 10/112*    (2013.01)
*H04J 14/04*    (2006.01)

(52) U.S. Cl.
CPC .......... *H04J 14/00* (2013.01); *H04B 10/1121* (2013.01); *H04B 10/616* (2013.01); *H04J 14/04* (2013.01)

(58) Field of Classification Search
None
See application file for complete search history.

(56) References Cited

U.S. PATENT DOCUMENTS

| | | | |
|---|---|---|---|
| 6,585,432 | B1 | 7/2003 | Palese |
| 6,975,664 | B1 | 12/2005 | Dodabalapur et al. |
| 9,154,253 | B2 | 10/2015 | Swanson et al. |
| 2005/0003309 | A1 | 1/2005 | Cho et al. |
| 2007/0133923 | A1 | 6/2007 | Park et al. |
| 2012/0224805 | A1 | 9/2012 | Doerr |

*Primary Examiner* — Darren E Wolf
(74) *Attorney, Agent, or Firm* — Wolf, Greenfield & Sacks, P.C.

(57) ABSTRACT

Disclosed herein are methods, structures, and devices for optical communications systems operating through turbulent media. More specifically, a spatial division multiplexing photonic integrated circuit is used in conjunction with digital signal processing systems to mitigate the effects of the turbulent media.

17 Claims, 9 Drawing Sheets

Prior Art

FIGURE 1

*Prior Art*

OPTICAL COMPENSATION USING A SPACE DIVISION MULTIPLEXING ELECTRO-OPTIC RECEIVER

CROSS REFERENCE TO RELATED APPLICATIONS

This application is a continuation, and claims the benefit under 35 U.S.C. §120, of U.S. patent application Ser. No. 14/071,217, filed on Nov. 4, 2013, and entitled "OPTICAL COMPENSATION USING A SPACE DIVISION MULTIPLEXING ELECTRO-OPTIC RECEIVER," which application is incorporated herein by reference in its entirety. U.S. patent application Ser. No. 14/071,217 claims the benefit of U.S. Provisional Application Ser. No. 61/722,223, filed on Nov. 4, 2012, and entitled "OPTICAL COMPENSATION USING A SPACE DIVISION MULTIPLEXING ELECTRO-OPTIC RECEIVER," which application is incorporated herein by reference in its entirety.

TECHNICAL FIELD

This disclosure relates generally to the field of optical communications and in particular to optical communications systems operating through turbulent media.

BACKGROUND

Optical communications systems (e.g. systems that use lasers or other free space techniques) oftentimes must operate through turbulent media. Accordingly, methods, apparatus and structures that improve the operation of such systems in turbulent media would represent a welcome addition to the art.

SUMMARY

An advance in the art is made according to an aspect of the present disclosure directed to methods, structures that mitigate the effects of turbulent media on the effectiveness and efficiency of optical communications systems. More specifically, this disclosure describes phototonic circuits and techniques that perform space division multiplexing in combination with adaptive digital signal processing techniques to provide such mitigation.

Viewed from a first aspect, the present disclosure is directed to methods and structures that collect light through the effect of receiver optics and direct that received light to a multimode optical amplifier which outputs amplified light that is further directed to photonic integrated circuit(s) where it is received and undergoes spatial division multiplexing and photodetection. Outputs of the photodetectors are sent to receiver electronics including transimpedance amplifiers (TIA), automatic gain control (AGC), analog to digital conversion (ADC) and/or other electronics. Various signals undergo digital signal processing such that adjustments are made to amplitude(s), phase(s), and delay(s) of the signals and subsequently combining them to enhance a received signal from which data is determined.

Viewed from another aspect, the present disclosure is directed to methods and structures that collect light through the effect of receiver optics, combine the received light with local oscillator laser light, then applying the combined light to photonic integrated circuit(s) that perform spatial division multiplexing and photodetection.

BRIEF DESCRIPTION OF THE DRAWING

A more complete understanding of the present disclosure may be realized by reference to the accompanying drawings in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

Figure 1:
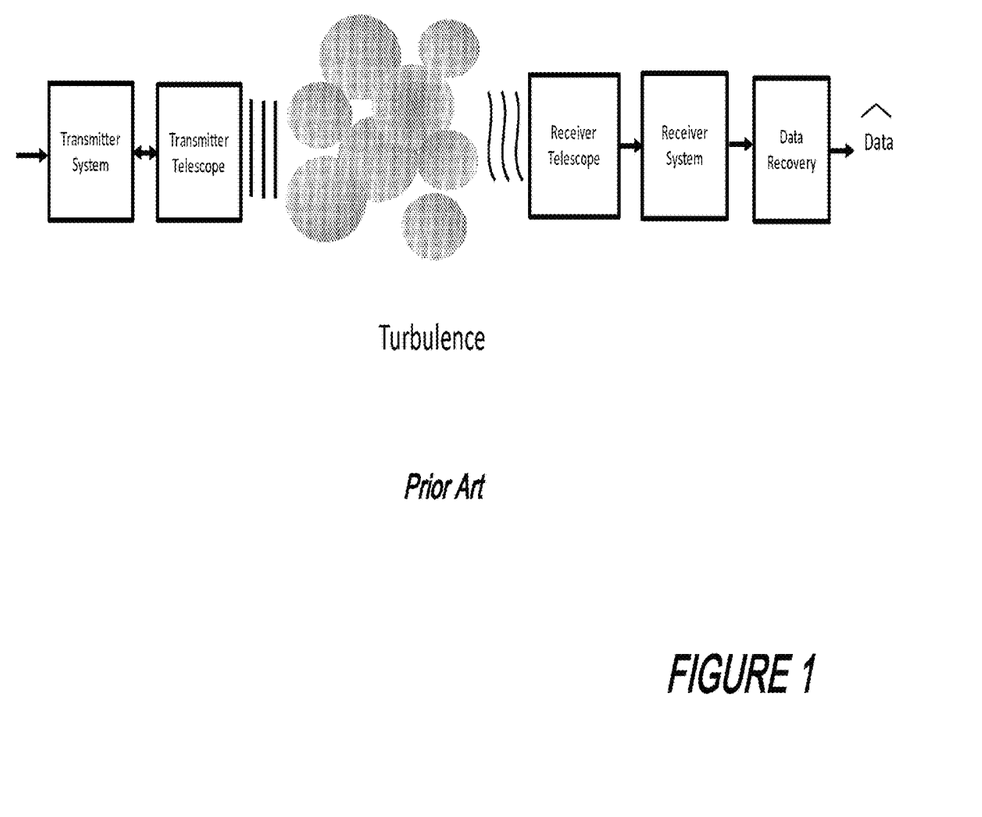
FIG. 1 shows a schematic illustration of an exemplary prior art optical communications system operating through turbulent media.

By way of some additional background, and with initial reference to FIG. 1 which depicts in schematic form an exemplary prior art optical communications system operating through turbulent media. As shown in that figure, data is transmitted by a transmitter system using a transmitter telescope through turbulent media. A receiver system receives the transmitted data via a receiver telescope and recovers the data for subsequent use. As will be readily appreciated, such optical communications systems (for example, those that use lasers) oftentimes must transmit through turbulent media—such as the atmosphere or other media—which may produce wavefront or other distortions.

Figure 2:
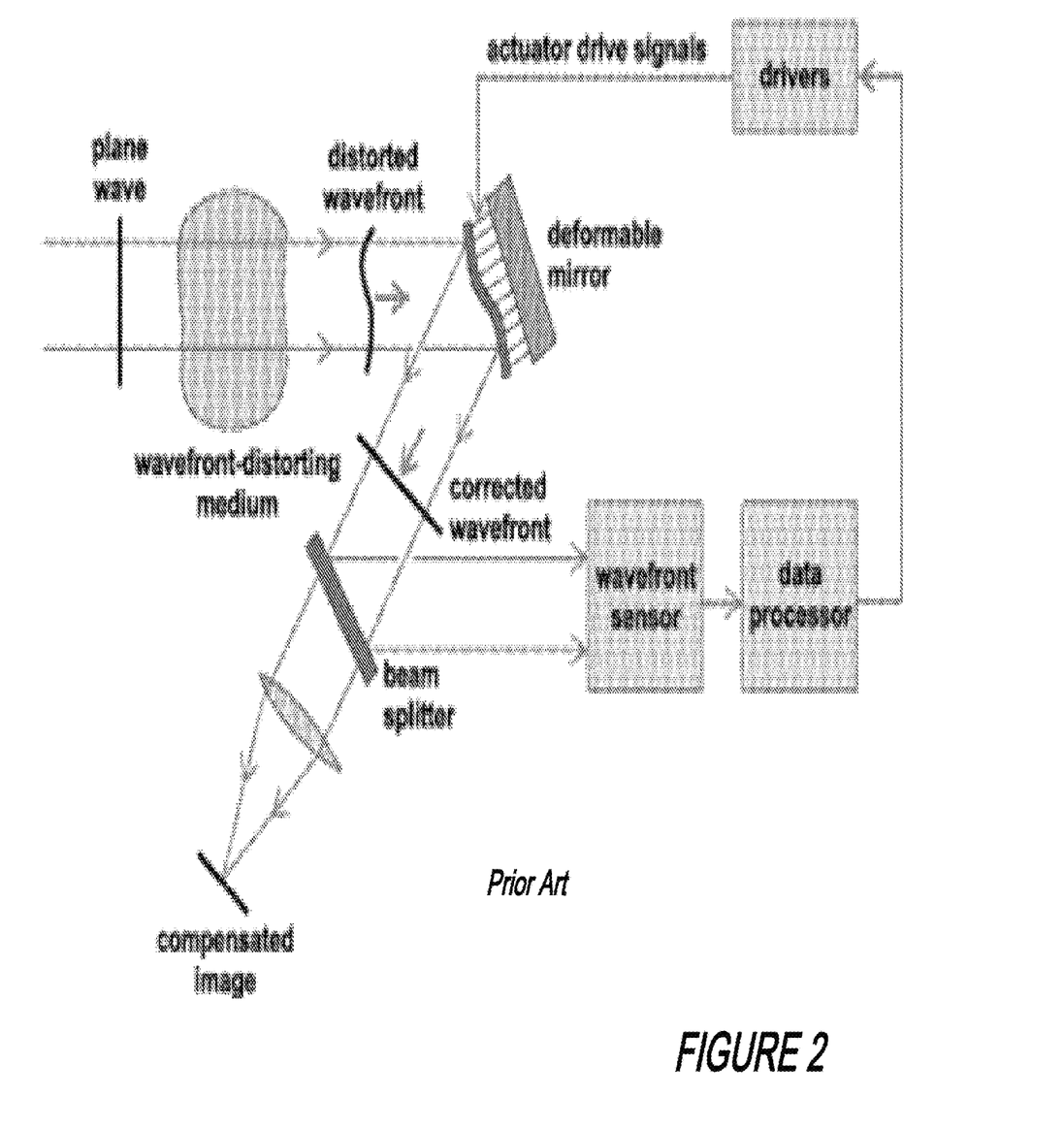
FIG. 2 shows a schematic illustration of a exemplary prior art adaptive optical system that employs a deformable mirror used to mitigate turbulence effects in an optical communications system.

In such environments, complex electro-optical-mechanical systems such as the deformable mirror adaptive optical system shown schematically in FIG. 2 may be employed. Shown in that figure are plane waves distorted by a wave-front-distorting medium (such as the turbulence depicted in FIG. 1). The distorted wavefront(s) are corrected through the effect of a deformable mirror that is adjusted by wavefront sensor and data processor/driver system such that a corrected, compensated image may be formed. As may be readily appreciated, such complex systems may be quite costly and may further require beacon lasers or other techniques to effectively compensate for the undesirable distortions described previously.

Figure 3:
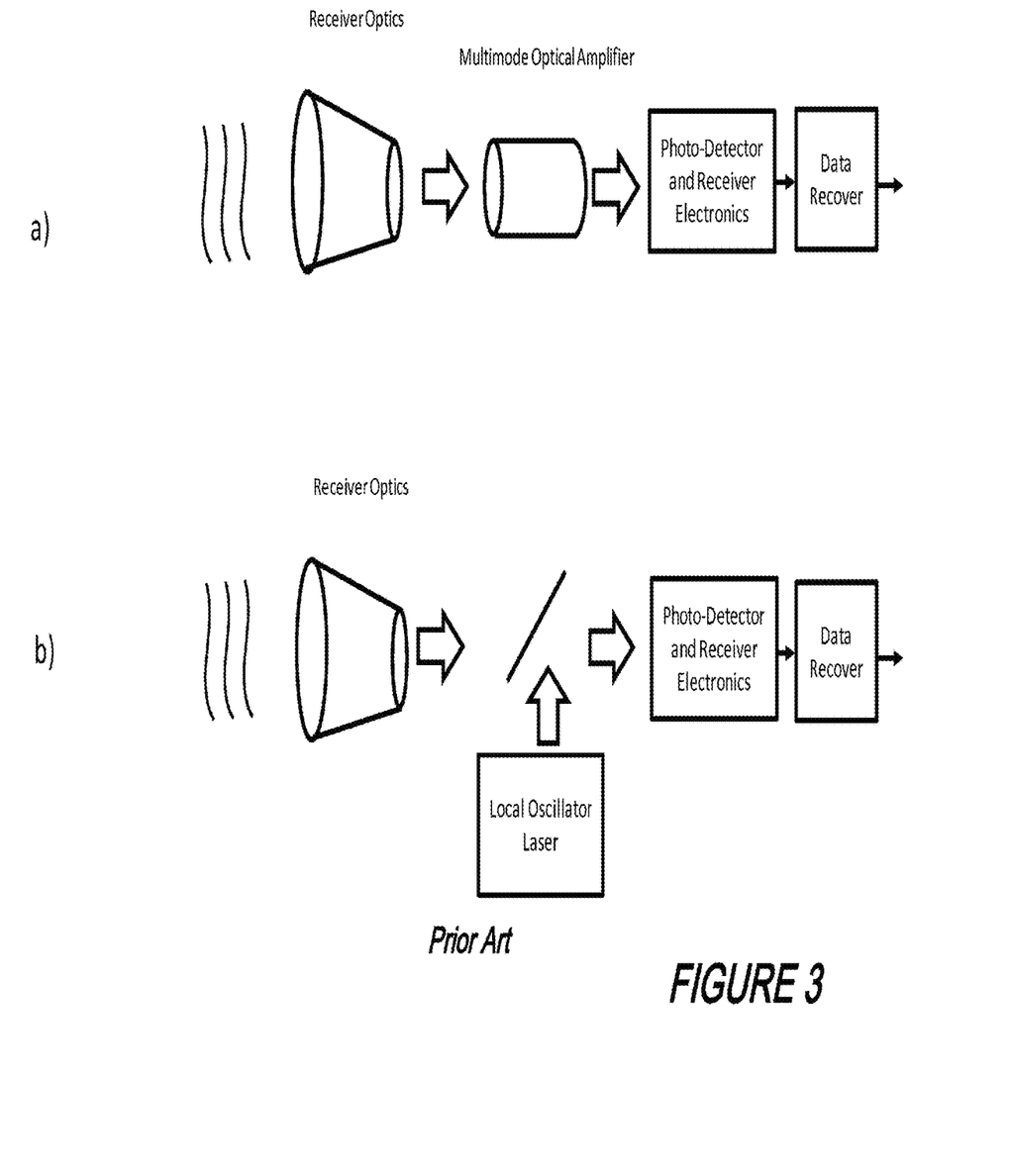
FIG. 3 shows a schematic illustration of an exemplary prior art optical communications system receiver that employs a multimode optical amplifier and local oscillator laser in combination with a multimode photodetector.

As may be appreciated by those skilled in the art, when very high speed optical communications systems require high sensitivity it is beneficial to employ optical amplifiers or coherent detection as depicted schematically in FIG. 3 which shows a system employing a multimode optical amplifier (FIG. 3(a)) and a system employing a coherent local oscillator laser (FIG. 3(b)).

Notably, there is a difficult tradeoff to be made when the telescope diameter is increased to collect more power and experience an improved signal to noise ratio as it is accompanied by the degradation that occurs from having a multi-mode receiver. More specifically, if the modes are not combined intelligently, then performance can be significantly worse than the situation where there is no atmospheric turbulence and a single mode receiver used.

As depicted and shown previously in FIG. 1, optical communications systems that transmit through turbulent channels—such as through the atmosphere, or fluids such as water—are challenged to collect light from a distant transmitter wherein the phase front is distorted and varying in time due to changing channel conditions. Oftentimes, such turbulent channels are characterized in terms of the nominal transverse coherence length ($R_0$). If a receiver telescope is significantly smaller than $R_9$, then dominant effect(s) of the turbulence includes tilt and fading. Fortunately—and as readily known in the art—tilt may be corrected using angular beam steering devices and spatial tracking systems.

Those skilled in the art will appreciate that with systems such as those depicted in FIG. 1, it is oftentimes desirable to increase the telescope aperture to collect more light such that better estimates of received data may be made. Such increase in aperture is desirable—for example—when long links such as links to/from space to/from Earth and/or very high speed links.

Of particular interest, as the telescope diameter of such systems increases, the wavefront across the telescope aperture is no longer simply composed of tilt. This characteristic poses additional problems for receivers that employ optical amplifiers or coherent local oscillators or their accompanying methods. More particularly, such receivers exhibit improved sensitivity in a single spatial mode but not when more than one spatial mode is collected at a time. If only a few spatial modes are detected, it may be possible to employ such techniques as those depicted in FIG. 3, however as the number of spatial modes increases or one needs to minimize deep signal fades, additional techniques are necessary.

Figure 4:
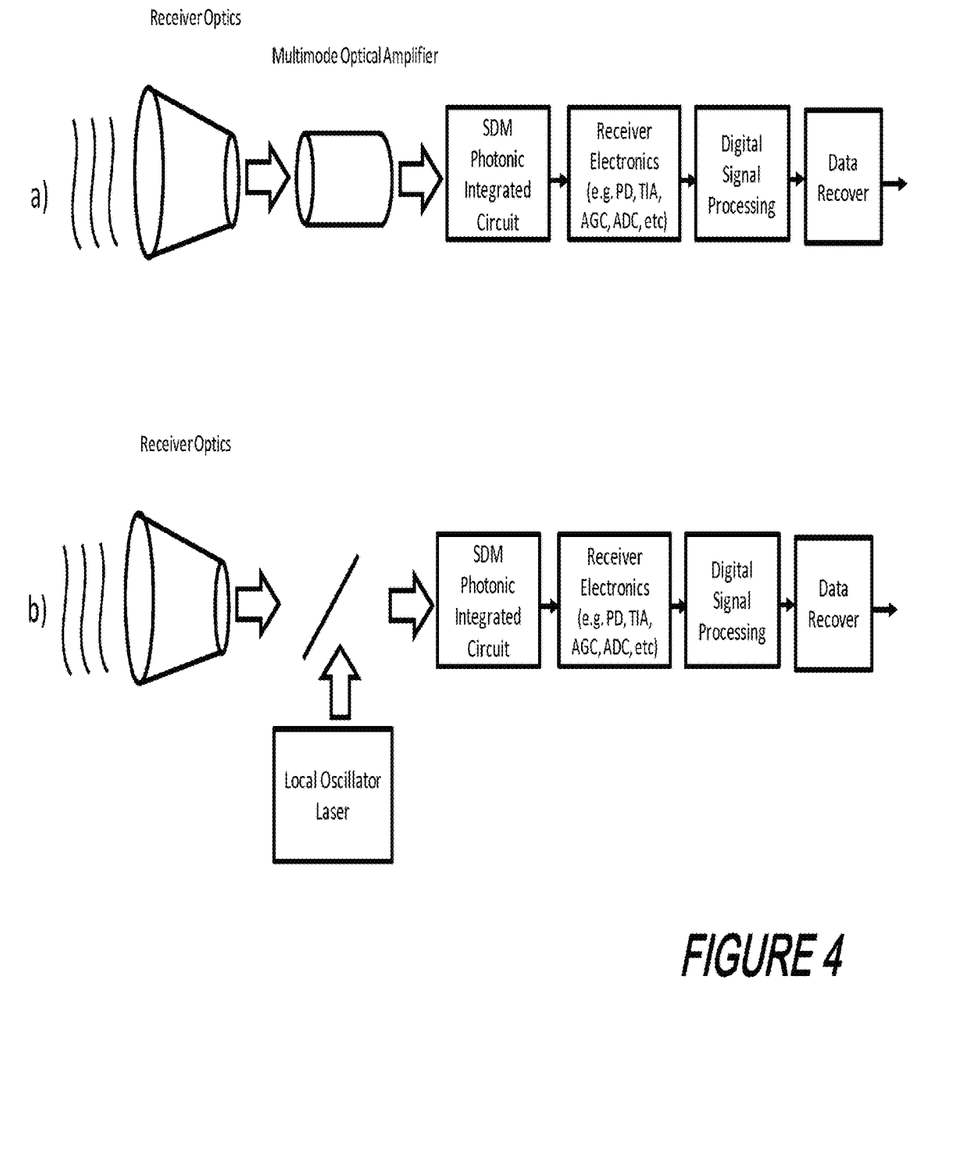
FIG. 4 shows a schematic illustration of an exemplary optical communications system according to the present disclosure that employs a photonic integrated circuit that performs spatial division multiplexing, electrical processing and digital signal processing wherein (a) a multimode optical amplifier is used and (b) a local oscillator is used.
Figure 5:
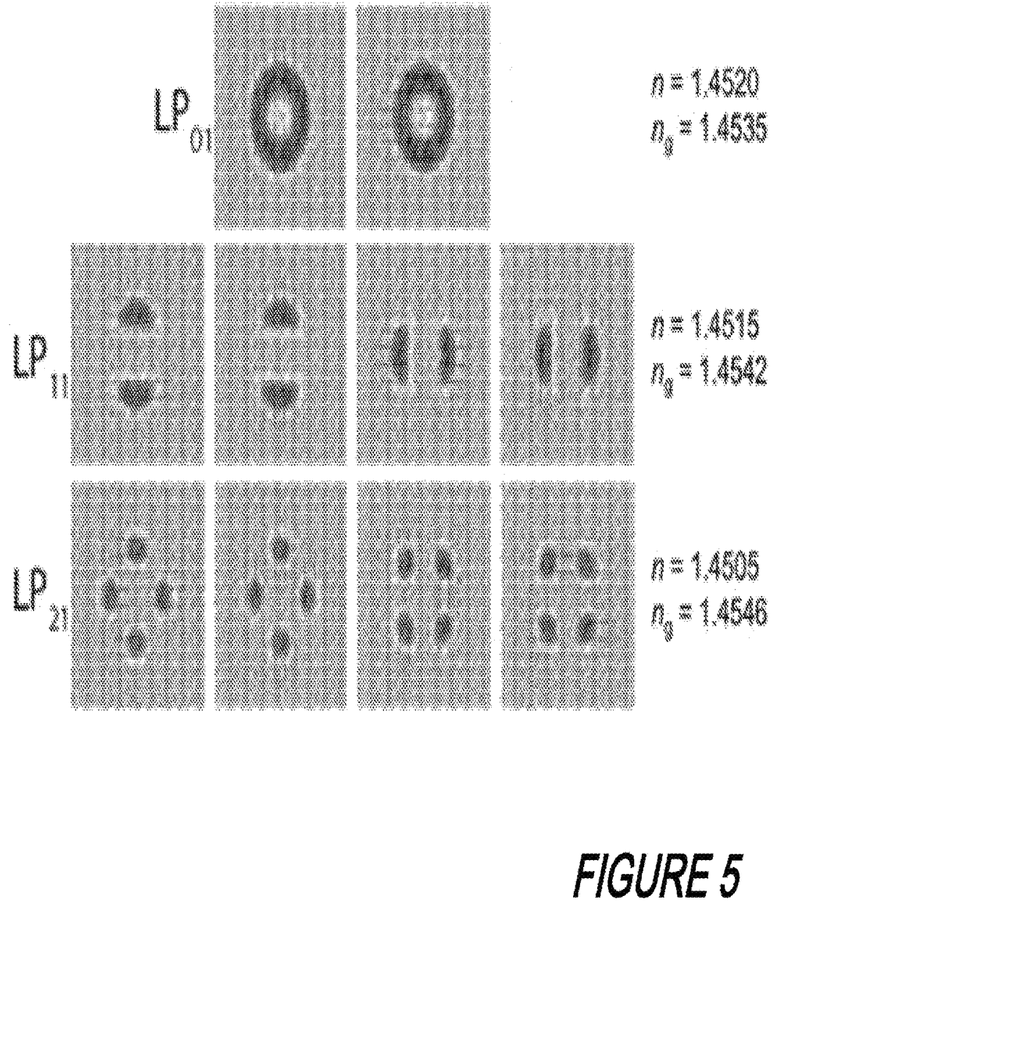
FIG. 5 shows a schematic illustration of exemplary low order fiber modes in a low order multimode fiber.

With these principles in place, we now turn to FIG. 4 which illustrates schematically structures according to the present disclosure in which a spatial division multiplexing circuit(s) is used in combination with a multimode optical receiver (4(a)), or with a local oscillator heterodyne or homodyne technique (4(b)). For example, if a multimode optical amplifier is employed the first few fiber modes may be represented such as that shown in FIG. 5.

Figure 6:
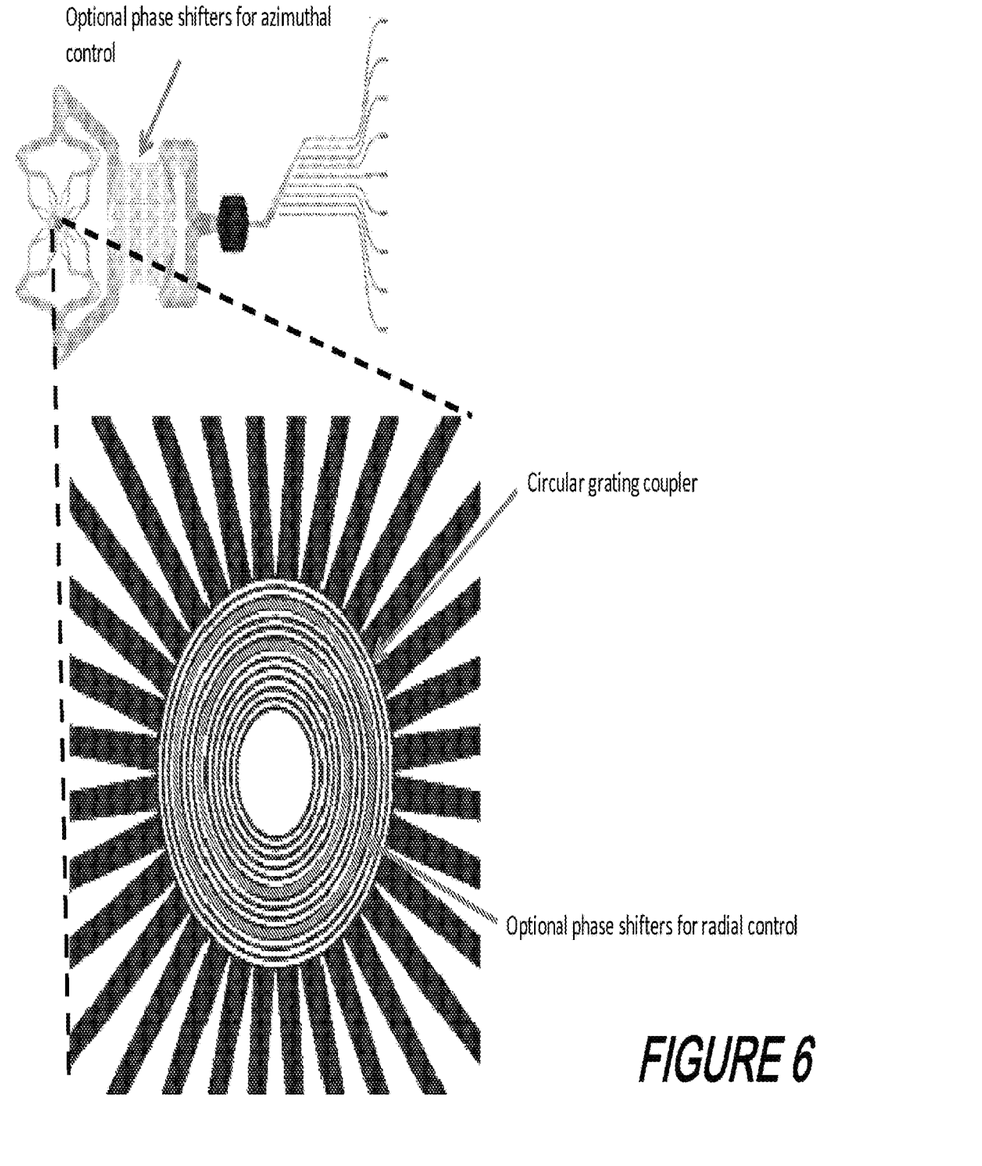
FIG. 6 shows a schematic illustration of an exemplary photonic integrated circuit according to the present disclosure that employs surface grating couplers and other techniques to collect multiple optical fiber modes such as those shown in FIG. 5 and spatially separate them into separate substantially orthogonal optical channels and perform photodetection on each channel separately.
Figure 7:
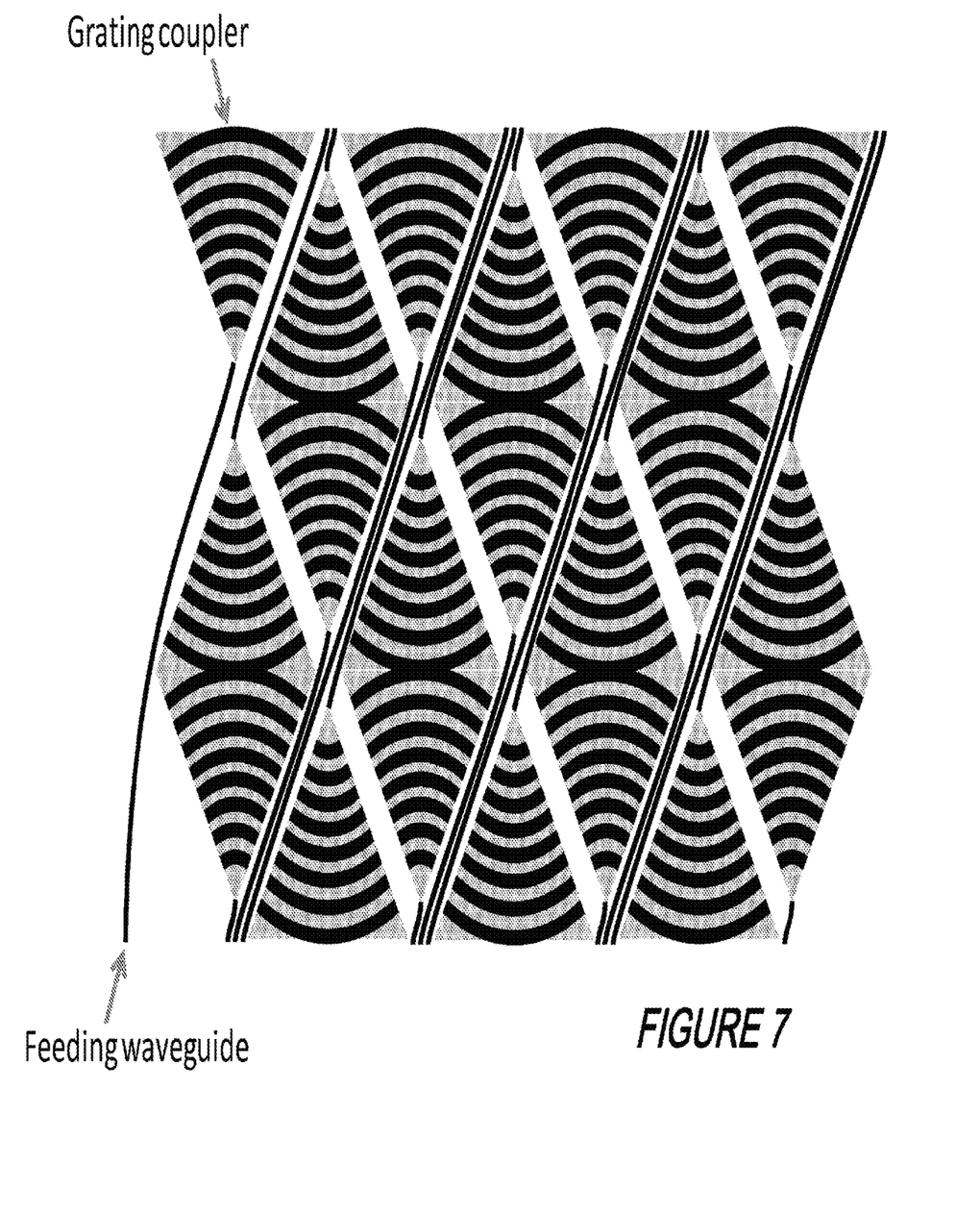
FIG. 7 shows a schematic illustration of an exemplary photonic integrated circuit according to the present disclosure that employs surface grating couplers coupled to waveguides to collect orthogonal spatial data.

Advantageously, and according to an aspect of the present disclosure, a photonic integrated circuit employing advanced optical components such as surface grating couplers, beam splitters, beam combiners, optical amplifiers, phase shifters and other optical elements such as those shown in FIG. 6 and FIG. 7, may be employed to spatially separate and collectively process optically and/or electrically the substantially orthogonal spatial modes. Once such processing is performed, additional digital signal processing techniques may then be employed to adjust the amplitude, phase and delay, and then to combine the various modes into one output (or two in the case of polarization division multiplexed transmitters) such that the combination results in mitigated effects of any turbulent channels. In particular situations, such processing may result in performance characteristics of an optical channel undergoing no turbulence when used with a signal spatial mode receiver.

As may be readily understood, there are a number of ways to extract nearly orthogonal modes from a multimode receiver. One such way to create and/or receive phasepatterned beam(s) is to employ grating couplers. As those skilled in the art will understand, a grating coupler is a periodic pattern in a vertically high-index-contrast waveguide—such as silicon-on-insulator (SOI) waveguide—in which light scattered from the grating may be phase matched to emit substantially vertically from the surface of a photonic integrated circuit. Preferably, the period of the grating is approximately to the effective wavelength of the waveguide.

In now describing further exemplary embodiments of systems and methods according to aspects of the present disclosure, we assume that such systems are reciprocal and that when we describe a beam emanating from the grating coupler, it is understood that the system may operate in a reciprocal or reverse direction. Accordingly, such systems may receive a beam traveling in an opposite direction to a beam transmitted.

Turning now to FIG. 6, there is shown an exemplary grating coupler according to an aspect of the present disclosure. More specifically, the grating coupler shown is a circular grating coupler that includes grooves arranged in substantially concentric circles. Shown further is an array of radially-arranged waveguides that may be used to direct light to the circular grating. These waveguides may be further connected to one or more input/output waveguides by one or more optical couplers.

As may be appreciated a number of controllable phase shifters may be optionally positioned within the radial waveguides such that the azimuthal phase distribution emanating from the grating (coupler) is controllable. However, one cannot control a radial phase distribution via such control of the waveguide phases. Consequently, and according to an aspect of the present disclosure, phase shifters may be advantageously positioned in the grating coupler in a circular pattern.

By way of example, and with continued reference to FIG. 6, there is shown a number of tunable phase shifters positioned inside the grating in a circular pattern. More specifically as one examines the grating depicted in that figure, it may be observed that the overall structure includes a number of concentric grating grooves with a number of phase shifters interposed therein concentrically at predetermined positions. Advantageously, such a structure provides the extraction of orthogonal angular momemtium modes and is efficient for turbulence that exhibits substantial circular symmetry.

In an exemplary embodiment and as shown as an inset in FIG. 6, the circular grating coupler array radial waveguides may be optically connected to an array of waveguides which comprise an array of output waveguides from a structure such as a star coupler. The input(s) of that star coupler may be coupled to an array of inputs. Shown further in that inset are a number of operational phase shifters for azimuthal control described above positioned within connecting waveguides.

Yet another approach to turbulence compensation is depicted in FIG. 7, which shows an example of a photonic integrated circuit having surface grating couplers and orthogonal spatial modes. As may be observed, a 2-Dimensional pattern of individual grating couplers may be curved with the curvature substantially centered on an inlet of a "feeding" waveguide. Notably, such "feeding" waveguides provide light to the particular curved grating that it feeds. Of further advantage the radius of curvature and length of the curve may be varied as dictated by particular requirements.

As shown in FIG. 7, the grating couplers are arranged in a triangular lattice, which is a 2-D lattice exhibiting the highest packing density. The waveguides feeding the individual grating couplers are formed between adjacent, individual gratings which may limit the size of the overall grating. Notwithstanding, if one needs a larger array or lattice, then arrangements wherein feeding waveguides from subsections are formed in a lower waveguide layer. Furthermore, a wide variety of gratings may be designed that operate with one waveguide or multiple waveguides per grating element. Such waveguides may be used to extract signal polarization or include multiple polarizations that may subsequently be separated using waveguide polarization splitters.

Figure 8:
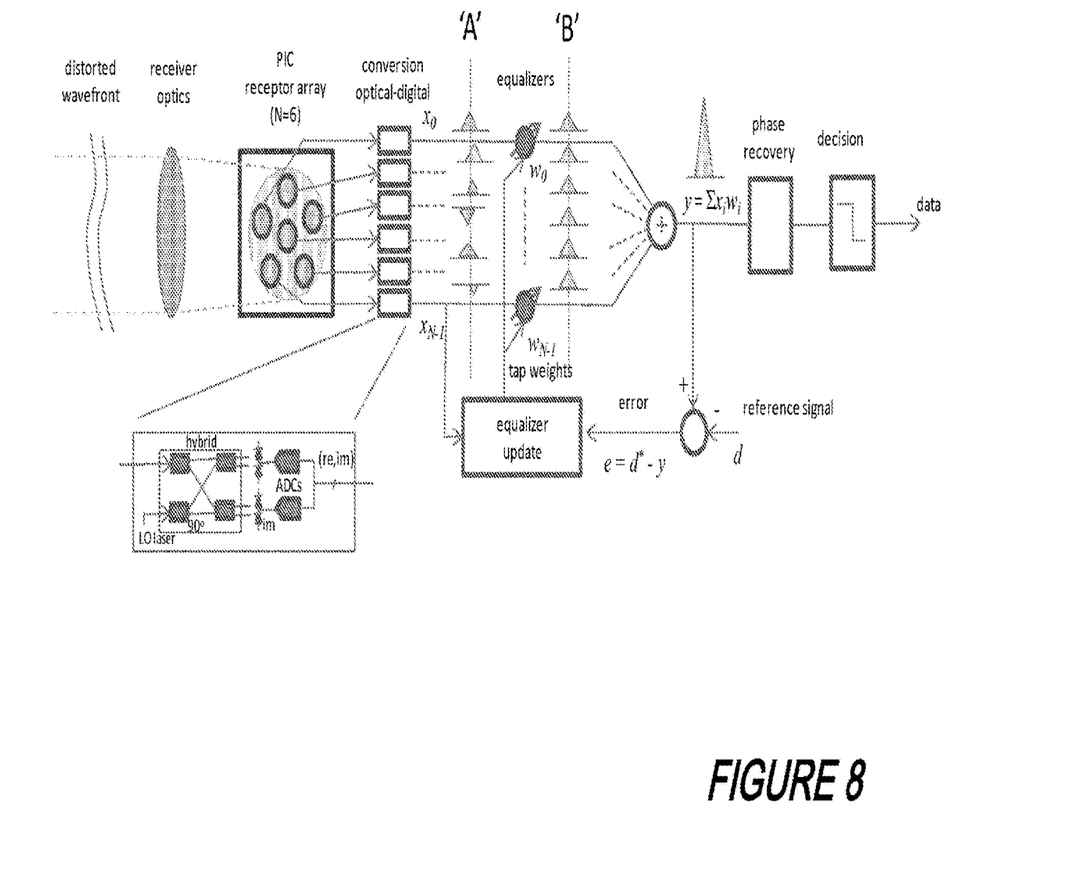
FIG. 8 shows a schematic illustration of an exemplary adaptive digital signal processor according to an aspect of the present disclosure.

With reference now to FIG. 8, there it shows a schematic illustration of exemplary data processing to recover a transmitted optical signal according to an aspect of the present disclosure. And while for simplicity we describe a case involving a single transmitted polarization state, the principles according to the present disclosure may be equally applied to those case(s) wherein two orthogonal states of polarization are transmitted, each carrying independent data.

As shown schematically in FIG. 8, as a received, distorted wavefront is received through the effect of receiver optics, it is imaged onto and captured by an array of receptors. At this point we note that the structures described are preferably formed onto/into a single photonic integrated circuit (PIC), although different requirements may dictate different arrangements. We note further that the receptor array depicted in the figure shows six (N=6) receptor elements, but those skilled in the art will understand that that number may be changed as well as requirements dictate.

Once the received optical wavefront has been imaged onto and captured by the array of receptors on the PIC, it may be processed for enhanced (e.g., optimal) signal reception. As depicted in the figure, the series of graphics at point "A" in the figure illustrate that the individual signal components $x_i$ produced by the receptors may vary in phase, amplitude and possibly delay since the received phase front is not uniform. As may be appreciated, one goal of signal processing is to manipulate these individual signals to $y_i$ and bring them into "alignment"—as indicated by the series of graphics at point "B" in the figure. When so aligned, the composite received is maximized with respect to any noise. Equalizers, positioned in each path may advantageously perform correction to each of the individual signals.

The signals are combined and—in the case of coherent detection such as that shown here—phase recovery is performed to compensate for the phase difference(s) between transmit and receive optical carriers. Finally, pre-determined decision criteria are used to determine/extract any data from the signal.

Advantageously, the signal equalization may be performed in either the optical domain before any photodetection, or in the electrical domain after photodetection. In the case of the former, optical phases may be adjusted with optical elements such as tunable couplers and phase shifters and delays. FIG. 8 however, illustrates the latter case where the individual optical signals are down-converted to an electrical baseband by mixing them with a common optical local oscillator and detecting with a combination of 90-degree optical hybrids and a pair of balanced photodetectors to produce a complex baseband signal.

After digitization by analog-to-digital converters (ADCs), the equalization may be performed numerically via digital signal processors (DSP). The equalizers illustrated in the FIG. 8 may be considered as single complex multipliers $w_i$. Advantageously, this allows the phase and amplitude of the signals to be adjusted. In certain situations there may be delays between pulses (arising for example, from dispersion in any multimode fiber). One solution for such situations is to use equalizers having multiple taps, each delayed in time to form a finite impulse response (FIR) filter that can also time shift and reshape the pulse.

As may be appreciated, particular methods and/or algorithms are useful to automatically adjust the equalizer $w_i$ to enhance or optimize the reception of the signal. Furthermore, such algorithms may continually run to adapt to changes in the transmission medium and any changes in turbulence.

Fortunately, there exist a number of techniques for such adaptive equalization. Such methods may be run either "blind"—that is, using only the received data information—or, be guided by inserted training sequences.

Methods employing training sequences may advantageously offer enhanced robustness however accompanied by additional complexity. Generally, with blind optimization, the equalized signal y is compared against a reference to determine an error, or cost metric, e. The value of e can be viewed as a surface in multi-dimensional space as function of $w_i$. The goal is to adjust equalizer weights $w_i$ in order to effectively minimize e.

If the direction of gradient at the current location $w_i$ is know, then $w_i$ are updated to new values so as to head "downhill" towards the minimum. In practice however, an analytical expression for the gradient of the error may not be available, and various methods have been developed to achieve this.

One common method of estimating the gradient and equalizer update is the Leaset Mean Square (LMS) method illustrated in FIG. 8. As a reference, LMS may use the detected signals (decision directed mode) or known transmitted "training signals". Choice of algorithm may depend on the modulation format for the data. The Constant Modulus Algorithm (CMA) is a common algorithm that exploits the properties of phase-modulated signals since the desired signal is known to lie on a constant radius. Such CMA algorithms ar successful in blind convergence. Generally, the equalizer update step for all methods involves a step-size parameter $\mu$ (mu) that controls how aggressively the algorithm descends to the minimum. The more aggressive the convergence, the faster the tracking is but more prone to instability and noise. Implementing an appropriate algorithm enables the receiver to optimize reception and adaptively track out variations in the optical phase front caused by transmission through turbulent media.

Figure 9:
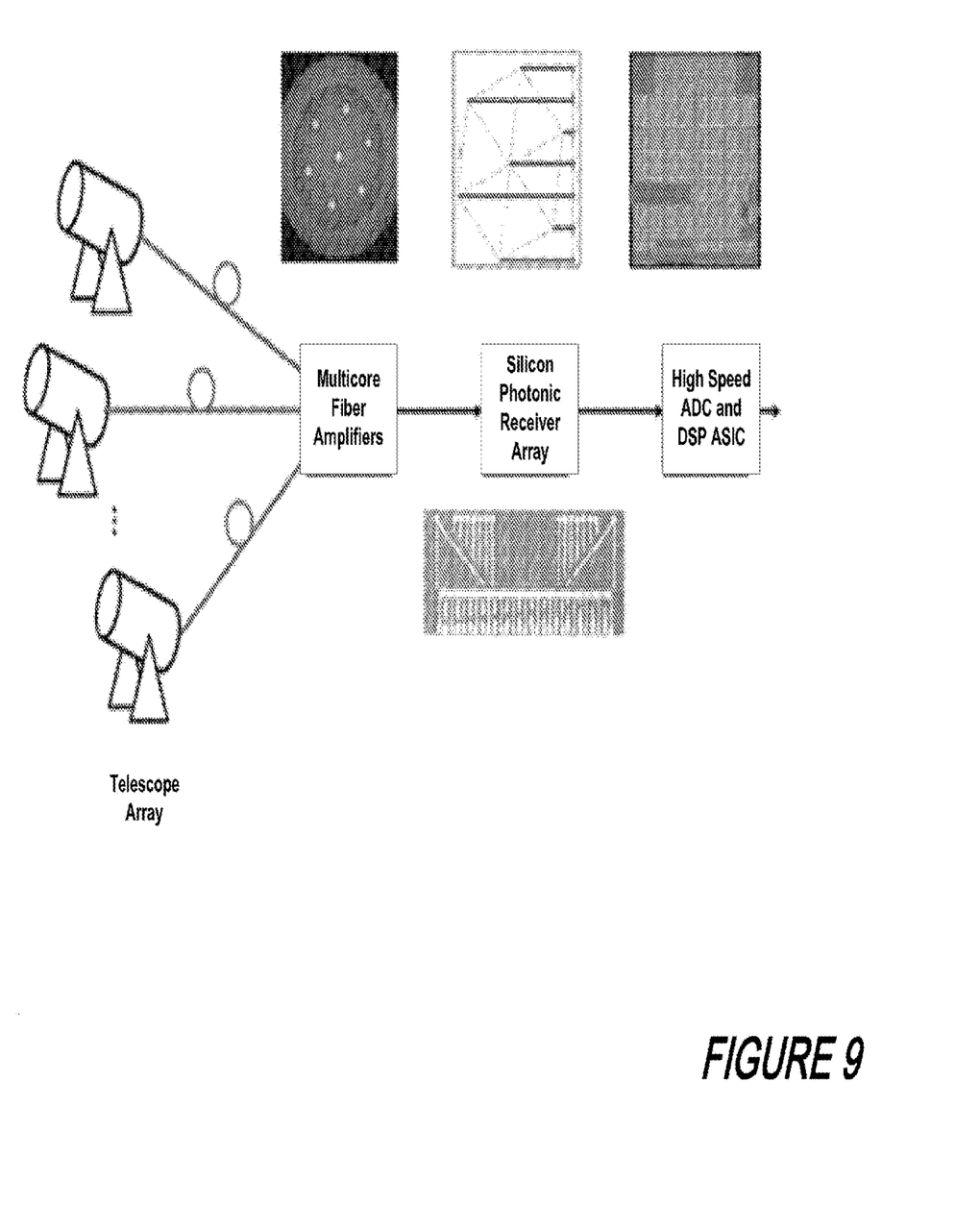
FIG. 9 show a schematic illustration of an exemplary optical communications system including a receiver telescope array for receiving optical signals after traversing turbulent media according to yet another aspect of the present disclosure.

Finally, and with reference to FIG. 9, there it shows another approach to compensation according to an aspect of the present disclosure. As shown in that figure, a telescope array is used to collect the optical signals which traverse the turbulent media. The signals so collected are then applied to a multi-core optical amplifier. The amplifier is in turn coupled to a silicon PIC array that may employ surface grating couplers that may advantageously be butt coupled to the array fiber amplifier. The PIC is then—in turn—coupled to a high speed ASIC processor for further processing and data extraction.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. An optical communication system, comprising:
   a photonic integrated circuit comprising:
      an optical momentum separator comprising a grating coupler having a plurality of rings; and
      an array of optical waveguides coupled to an outermost ring of the plurality of rings of the optical momentum separator's grating coupler;
   a digital circuit comprising a plurality of analog-to-digital converters, wherein at least two of the analog-to-digital converters are coupled to respective waveguides of the array of waveguides; and
   a compensation circuit comprising a plurality of signal equalizers comprising phase adjusters, wherein at least two of the signal equalizers are coupled to outputs of respective analog-to-digital converters of the plurality of analog-to-digital converters.

2. The optical communication system of claim 1, wherein the plurality of rings are a plurality of concentric grooves, including an outermost concentric groove, and wherein the array of optical waveguides comprises a plurality of radially oriented waveguides disposed around a perimeter of the outermost concentric groove.

3. The optical communication system of claim 1, wherein the plurality of rings include a plurality of circular rings.

4. The optical communication system of claim 1, further comprising a receiving telescope configured to collect a wave front corresponding to an optical signal and to provide the optical signal to the photonic integrated circuit.

5. The optical communication system of claim 4, further comprising a local oscillator laser configured to generate a reference signal, wherein the optical communication system is configured to beat the reference signal against the optical signal.

6. The optical communication system of claim 1, wherein the signal equalizers comprise time delay adjusters.

7. The optical communication system of claim 1, further comprising a phase shifter disposed adjacent a ring of the plurality of rings of the grating coupler.

8. The optical communication system of claim 2, further comprising a phase shifter coupled to one radially oriented waveguide of the plurality of radially oriented waveguides.

9. The optical communication system of claim 1, wherein a portion of the photonic integrated circuit is made of silicon.

10. A method, comprising:
    receiving an optical signal exhibiting a plurality of angular momenta by imaging the optical signal on an optical momentum separator comprising a grating coupler having a plurality of rings;
    with the optical momentum separator, spatially separating two or more portions of the optical signal based on the two or more portions exhibiting different angular momentum from each other by directing the two or more portions of the optical signal from an outermost ring of the plurality of rings to respective optical waveguides of an array of optical waveguides;
    with a plurality of analog-to-digital converters coupled to the array of optical waveguides, digitizing the two or more spatially separated portions of the optical signal to produce two or more digitized portions;
    with a compensation circuit, receiving from the plurality of analog-to-digital converters the two or more digitized portions and adjusting at least one amplitude associated with at least one of the two or more digitized portions to compensate.

11. The method of claim 10, further comprising combining the compensated digitized portions to produce an output signal.

12. The method of claim 10, further comprising amplifying the optical signal with a multimode optical amplifier.

13. The method of claim 10, further comprising beating the optical signal with a reference signal.

14. The method of claim 10, wherein the plurality of rings include a plurality of circular rings.

15. The method of claim 10, further comprising adjusting at least one phase associated with the at least one of the two or more digitized portions to compensate for phase differences between the two or more digitized portions.

16. The method of claim 10, further comprising adjusting at least one time delay associated with the at least one of the two or more digitized portions to compensate for time delay differences between the two or more digitized portions.

17. The method of claim 10, wherein receiving the optical signal comprises receiving the optical signal through a turbulent medium.

* * * * *